United States Patent [19]

Maget

[11] Patent Number: 5,038,821
[45] Date of Patent: Aug. 13, 1991

[54] ELECTROCHEMICAL CONTROL VALVE

[76] Inventor: Henri J. R. Maget, 6455 La Jolla Blvd., La Jolla, Calif. 92037

[21] Appl. No.: 563,037

[22] Filed: Aug. 6, 1990

[51] Int. Cl.⁵ .............................................. G05D 7/06
[52] U.S. Cl. ................................ 137/486; 137/487.5; 251/129.04
[58] Field of Search ..................... 137/486, 487.5, 468; 251/11, 61, 129.01

[56] References Cited

U.S. PATENT DOCUMENTS

| 4,402,817 | 9/1983 | Maget | 204/301 |
| 4,522,698 | 6/1985 | Maget | 204/310 |
| 4,550,747 | 11/1955 | Woodworth | 137/487.5 |
| 4,648,955 | 3/1987 | Maget | 204/258 |
| 4,687,020 | 8/1987 | Doyle | 137/457.5 X |
| 4,687,423 | 8/1987 | Maget et al. | 417/379 |
| 4,877,051 | 10/1989 | Day | 137/487.5 X |
| 4,886,514 | 12/1989 | Maget | 604/891.1 |
| 4,901,758 | 7/1990 | Cook | 137/487.5 |
| 4,902,278 | 2/1990 | Maget et al. | 604/132 |

Primary Examiner—Alan Cohan
Attorney, Agent, or Firm—Brown, Martin Haller & McClain

[57] ABSTRACT

An electrochemically actuated control valve is disclosed which represents a new class of devices for fluid flow control. The valve is activated by an electrochemical motor which converts DC electrical energy into compressed gas energy suitable for producing mechanical work. The mechanical motion is typically reciprocating linear motion. This linear displacement can be accurately controlled, can be modulated at high frequencies and responds quasi-instantaneously to the applied DC voltage. The electrochemical valve can be computer or microprocessor-controlled.

10 Claims, 1 Drawing Sheet

ELECTROCHEMICAL CONTROL VALVE

BACKGROUND OF THE INVENTION

1. Field of the Invention

This invention generally involves control valves and more particularly involves a pressure-activated control valve.

2. Description of Related Art

A control valve is a final controlling element that directly changes the value of the controlled variable in an automatic control system by varying the rate of flow of some fluid or gas. The control valve is well-known in the control arts and has been defined as a continuously variable orifice in a fluid-flow line. The complete control valve consists of an actuator and a valve body. The actuator provides the power to vary the port opening in the valve body. The valve body assembly consists of a pressure-tight chamber that is fitted into a pipeline.

Control valves are often classified on the basis of the means of actuation as pneumatically, hydraulically or electrically operated valves. Electrical actuators for control valves are also often categorized into two basic categories: inherently two-position actuators, including solenoids and relays, and inherently infinite-position actuators, including reversible electric motor drives, saturable-core reactors, silicon-controlled rectifiers, variable-speed electric motor drives, and electropneumatic convertors. Each of these well-known types of devices requires an external compressed air or AC line power supply. All have many moving parts contributing to wear and eventual failure and are not generally suitable for application to microminiature control systems operating from limited power supplies.

An electrochemical cell is typically formed by positioning a rigidly-supported electrolytic membrane between and in contact with a cathode and an anode. Such a cell can either generate electricity (chemical to electrical) or do mechanical work (electrical to mechanical). When the cell is configured as a "fuel cell" to generate electricity, a fuel gas such as hydrogen is supplied to the anode and a gaseous oxidant such as oxygen is supplied to the cathode. When the cell is configured as a motor to produce mechanical energy, an electrical voltage is applied across the anode and cathode, and an electrochemically active gas (capable of entering into an oxidation/reduction reaction) is supplied to the anode. At the anode, the gas is ionized and the ions travel across the electrolytic membrane in response to the voltage gradient across the membrane. At the cathode, the ions are reconverted to molecules of the gas, thereby increasing the pressure on the cathode side and decreasing the pressure on the anode side of the membrane. The result is a pumping action across the membrane from anode to cathode. U.S. Pat. No. 4,402,817 issued to Henri J. R. Maget on Sept. 6, 1983 discloses such a single cell used as a prime mover. The absence of moving parts other than a flexible bellows or diaphragm permits many useful embodiment,,s as disclosed in copending patent application Ser. No. 07/563,050 titled "Efficient Electrochemical Motor" filed concurrently herewith.

The application of the electrochemical motor as a valve actuator is unknown in the art. Because the electrochemical motor can operate continuously over a wide dynamic range (e.g. 250 to 1) and with precision unavailable in an electromechanical motor, which tends to stall at low speeds, the electrochemically actuated control valve represents a new class of electrically actuated control valves. There are unresolved problems and deficiencies clearly felt in the art, which are solved by the present invention in the manner described below.

SUMMARY OF THE INVENTION

The present invention is an electrochemically actuated control valve which represents a new class of devices for fluid control. The valve is actuated by an electrochemical prime mover that converts DC electrical energy into compressed gas energy that is then used to produce mechanical work. The mechanical motion of the electrochemical actuator is typically linear motion. This linear displacement can be accurately controlled, can be modulated at high frequencies and responds practically instantaneously to changes in the applied DC voltage. The electrochemically actuated valve can be computer or microprocessor controlled in response to pressure, temperature or flow sensor inputs.

An important advantage of the present invention is the efficiency of the valve actuator. The energy consumption is small because the electrochemical actuator operates reversibly. Another advantage is that the present invention is compatible with standard DC battery power. Yet another advantage of the present invention is that the electrochemical cell within the valve actuator can be modulated at high frequencies and is sensitive to rapid changes in the electrical valve actuation signal including polarity reversal. The electrochemical cell responds essentially instantly to changes in current and the valve actuator displacement is infinitely variable under current control. Because of the high precision of the valve actuator, the present invention operates with a very large dynamic range; from extremely small displacements, which would stall all DC-motor actuated valves known in the art, to high displacements (e.g. 250 to 1).

The electrochemical actuator has no moving parts other than a flexible diaphragm or bellows. This feature permits the electrochemically actuated valve to be fabricated for micro-miniaturized flow control applications. Another advantage of the present invention is the flexible configuration of the electrochemical valve actuator which allows the present invention to be fabricated without limitation by the physical relationship between electrochemical actuator components.

The foregoing, together with other features and advantages, will become more apparent after referring to the following specification and claims in conjunction with the accompanying drawings.

BRIEF DESCRIPTION OF THE DRAWINGS

For a more complete understanding of the present invention, reference is now made to the following detailed description of preferred embodiments as illustrated in the accompanying drawings wherein.

DESCRIPTION OF THE PREFERRED EMBODIMENTS

Figure 1:
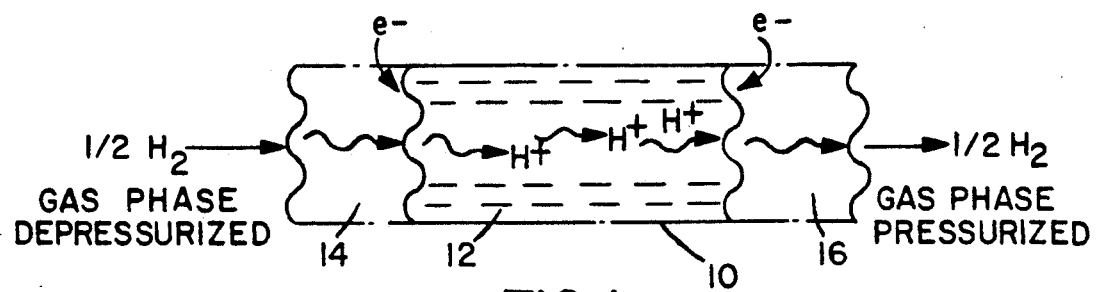
FIG. 1 shows a schematic representation of the electrochemical ionic transportation process which occurs in the electrolytic membrane.

Referring to FIG. 1 which illustrates the ionic transfer mechanism occurring across an electrolytic membrane 10, we see an ionomer 12 having two electrodes 14 and 16 in intimate electrical contact, one on each side. Electrodes 14 and 16 are pervious to hydrogen gas ($H_2$), permitting the hydrogen molecule to move from the electrode surface to the ionomer 12 surface. By applying a voltage to electrodes 14 and 16, well-known processes occur which result in the oxidation of hydrogen atoms, ($\frac{1}{2}H_2$) at the surface between electrode 14 and ionomer 12 and reduction of hydrogen ions ($H^+$) at the interface between ionomer 12 and electrode 16. As part of this process, an electron ($e^-$) is removed from electrode 14 for each such oxidation and an electron is added to electrode 16 for each such reduction. This process may be reversed merely by reversing the voltage applied to electrodes 14 and 16. The overall process results in a net flux of hydrogen from anode to cathode, thus depleting hydrogen in the anodic chamber and increasing hydrogen in the cathodic chamber. Any change in the voltage applied between electrodes 14 and 16 will change the rate of removal and insertion of electrons and thereby directly and proportionately change the rate of hydrogen movement across cell membrane 10.

The practical application of this electrochemical pumping process to the compression and decompression of stored hydrogen requires the use of a rigid by-supported electrolytic separator such as cell membrane 10 in FIG. 1. Such a separator must have a high ionic conductivity, must tolerate high current densities and exhibit low hydrogen diffusion resulting from a pressure differential across the separator. Perfluorosulfonated ionomer membranes are well-suited for this purpose and well-known in the art. For instance, refer to "Ion Exchange Membrane Fuel Cells" by H. Maget, *Handbook of Fuel Technology*, C. Berger, editor, Prentice Hall, Inc., 1968. Also, refer to LaConti A. B. et al. "Electrode Materials and Processes for Energy Conversion," *ECS Proceedings*, pgs. 354-374, 1977.

Figure 2:
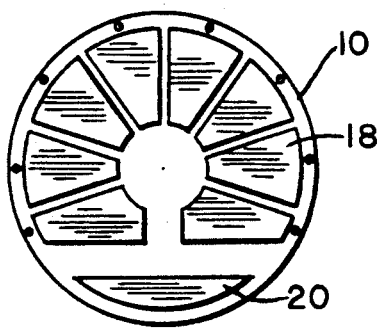
FIG. 2 illustrates a useful embodiment of the pervious electrode pattern used on both surfaces of the electrolytic membrane.

In FIG. 2, the conventional single electrode pair attached to the membrane surface is replaced by series-connected multiple cells mounted on the same membrane. Identical areas are not required, but are convenient because they would result in identical current densities for each individual electrode. Electrode surface 16 in FIG. 1 is illustrated in FIG. 2 as having eight individual electrodes with surface area similar to the surface area of electrode 18. This approach reduces the single cell current by eight times and multiplies the cell operating voltage by the same factor of eight. Rigidity of the thin electrolytic membrane is achieved by placing it between two identical circuit boards 11 and 13 shown in FIG. 4. These are designed to match the individual cell geometries and cross-membrane series connections are achieved by means of conductive paths located at the printed circuit board periphery (not shown).

Operation of the electrochemical valve requires knowledge of the relative pressures in the cathodic and anodic chambers of either side of cell membrane 10. To avoid the additional expense and complexity of adding independent pressure sensors in each chamber, an electrochemical hydrogen pressure sensor is incorporated on cell membrane 10 as electrode 20 in FIG. 2, which is electrically isolated from multi-junction electrodes 18. The electrochemical pressure sensor is a novel invention unknown in the art and is the subject of copending patent application Ser. No. 07/563,051 entitled "Electrochemical Force Sensor" filed concurrently herewith.

Figure 3:
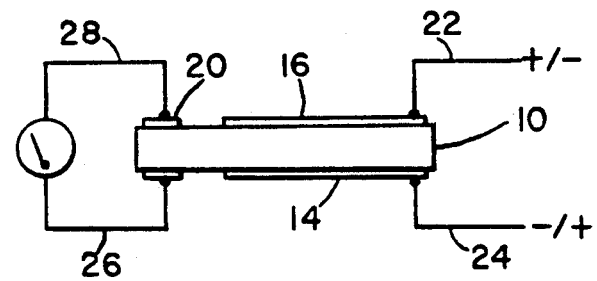
FIG. 3 illustrates the placement of an isolated pressure sensor on the electrolytic membrane surface.

The sensor voltage resulting from the pressure differential across cell membrane 10 is monitored and used to control the operation of the electrochemical valve. This concept is illustrated in FIG. 3, where pressure sensor 20 is shown isolated from electrodes 14 and 16 on cell membrane 10. In FIG. 3, electrical conductors 22 and 24 provide electrical energy to the electrochemical cell and electrical conductors 26 and 28 access the pressure sensor output voltage.

As mentioned above, the rigidly-supported electrochemical cell acts to pump gas molecules through ionomer cell membrane 10 in response to applied voltage. The electrochemical hydrogen pressure sensor uses the pressure/voltage transduction phenomenon in reverse. That is, a voltage is induced across membrane 10 at electrodes 20 in response to the pressure differential across membrane 10. The rigid support of membrane 10 allows it to maintain such a pressure difference. The electrical isolation of electrodes 20 prevents the sensor voltage from being masked by the drive voltage imposed on electrodes 18 by conductors 22 and 24. For hydrogen, this voltage in similar is approximately 13 1 n ($P_{ratio}$). Thus, for a pressure ratio ($P_{ratio}$) of 1.01, the sensor output voltage at electrodes 20 is about 0.13 similar. The membrane and electrode materials and properties necessary for the electrochemical hydrogen pressure sensor are identical to those properties disclosed for the rigidly-supported electrochemical cell membrane 10 used in the present invention.

Figure 4:
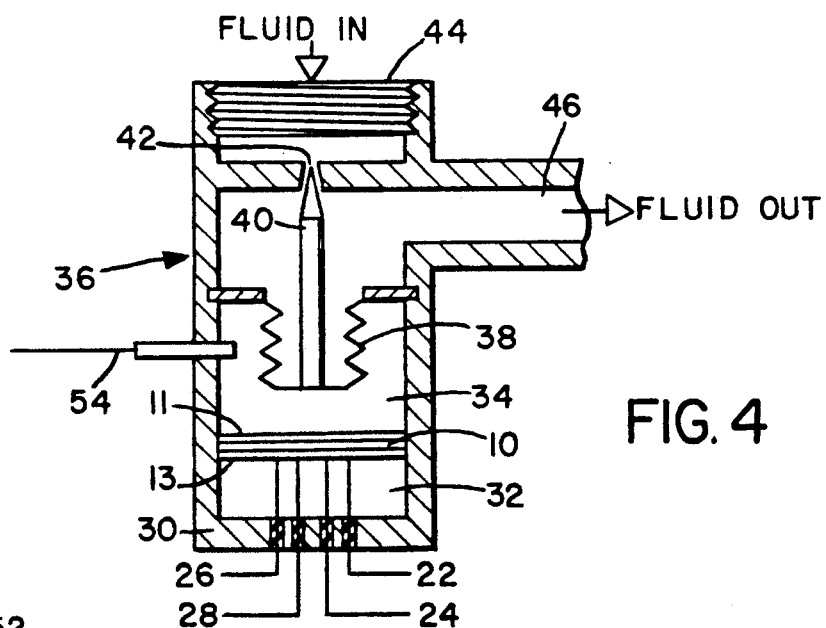
FIG. 4 shows a schematic representation of an electrochemical valve of this invention embodied as a needle valve.
Figure 5:
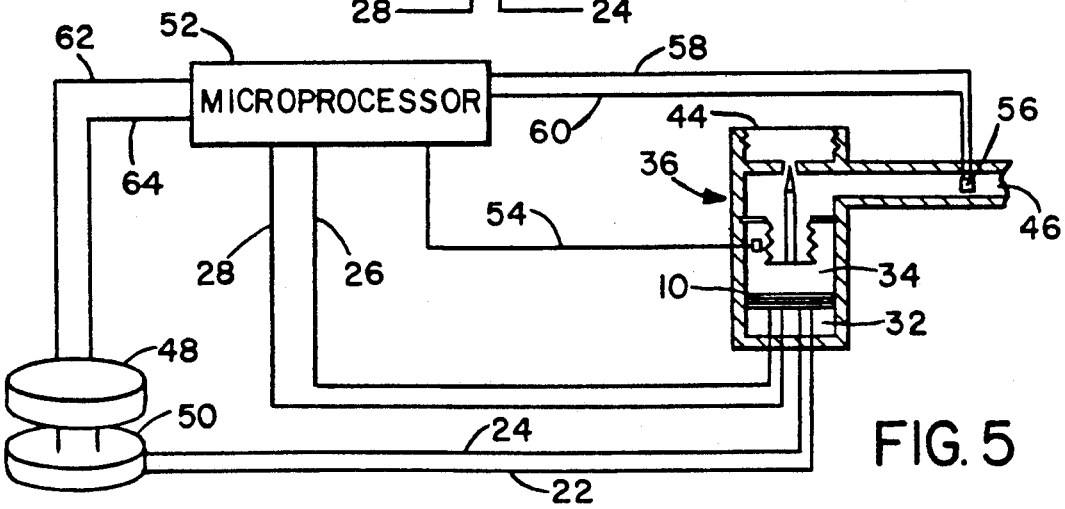
FIG. 5 illustrates the preferred embodiment of an integrated, independent electrochemical control valve system including the electrochemical valve of FIG. 4.

The rigidly-supported membrane assembly illustrated in FIGS. 4 and 5 has a thickness of less than 5 millimeters, including the membrane, electrodes, and structural support plates, although thicknesses up to 10 mm and above are practical. The membrane thickness alone may be 0.25 mm. Electrical conductors 22, 24, 26 and 28 are routed to external electrical terminals (not shown). The membrane assembly is installed in a rigid pump housing 30 as shown in FIGS. 4 and 5, dividing housing 30 into two pump chambers, 32 and 34. The needle valve assembly 36 is the other key component of the electrochemical valve. These two key valve components are schematically illustrated in FIG. 4.

Referring to FIG. 4, during operation of the electrochemical valve, storage chamber 32 and pump chamber 34 are filled with an electrochemically active gas such as hydrogen. A current is applied to conductors 22 and 24, which results in a gas flow across membrane 10 as discussed above. When the flow moves hydrogen from chamber 34 to chamber 32, bellows 38 moves downward toward membrane 10 in response to the pressure drop in chamber 34. As bellows 38 moves downward valve stem 40 moves downward and away from valve opening 42, allowing fluid to move from fluid inlet port 44 to fluid outlet port 46. To close the valve, the polarity of the current in conductors 22 and 24 is reversed, resulting in an increasing pressure in chamber 34, an upward movement in bellows 38 and valve stem 40 which closes the valve at valve opening 42, thereby halting fluid flow from port 44 to port 46.

Referring to FIG. 5, power conditioning means 48 and power source (battery) means 50 provide the necessary current for electrochemical valve operation. Microprocessor 52, under store-program control, is responsive to temperature sensor 54 input, pressure sensor input (on conductors 26 and 28) and flow meter 56 input (on conductors 58 and 60). Microprocessor 52 provides the commands to power conditioner 48 through conductors 62 and 64. Under control of microprocessor 52, power conditioner 48 provides the requisite drive current to electrochemical membrane 10 through drive conductors 22 and 24, the remainder of FIG. 5 functions as discussed above in connection with FIG. 4.

It will be appreciated that the integrated electrochemical control valve system illustrated in FIG. 5 can provide precise, rapid control of fluid flow from input port 44 to output port 46 under control of microprocessor 52, according to temperature, pressure, and flow information from the sensors shown. Because rigidly-supported electrochemical assembly 10 provides precise control of the pressure in pump chamber 34 as a function of the current on conductors 22 and 24, needle valve stem 40 can be positioned with a precision better than 0.05%. A primary advantage of the present invention is the availability of this precision under the simple local control means illustrated in FIG. 5.

If the electrochemical control valve is operated with pressure ratio sensor 20 in FIG. 3, a calibration should be performed to establish the relationship between sensor voltage between conductors 26 and 28 and fluid flow rate. Once accomplished, the calibration information can be stored in microprocessor 52 and used to set the sensor voltage threshold for regulating the driver current in conductors 22 and 24 needed to provide the requisite needle valve stem 40 location. If flow sensor 56 is used, the flow sensor signal can be used also to modulate the drive current in conductors 22 and 24 necessary to maintain the flow at the desired level. The typical electrochemical control valve system should not require both a pressure sensor and flow meter sensor means because both serve the same purpose.

Under certain conditions, it is possible to use the pressure drop across the valve orifice 42 as a flow rate measurement means. This would eliminate the need for separate flow sensor 56.

In fluidic amplification, small, controllable orifice electrochemical valves offer several advantages. The first advantage is the accuracy and sensitivity of control. Any easily measurable current will provide a precisely-known quantity of gas transferred across cell membrane 10. Because electrical currents can be measured accurately, it is possible to control linear displacement with great precision. Since the electrochemical cell should respond to frequencies up to 1 kHz, the membrane response to a change in electrical current is completed within 1 msec or better.

The second advantage is design flexibility. Because all elements of the electrochemical valve are functionally independent, the location of storage chamber 32, rigidly-supported electrochemical membrane 10, and bellows 38 are flexible. That is, a side-by-side arrangement can yield a flat electrochemical valve. Similarly, the electrochemical cell 16 can be fabricated as a rectangular rather than circular cell.

A third advantage is inherent reliability. The only moving part in the electrochemical valve of FIG. 5 is the flexible bellows and needle valve stem assembly. Electrochemical devices have been operated in excess of 10,000 hours under severe conditions. The behavior of electrochemical cells with large numbers of polarity reversals is not well-known, but the inventor has conducted tests of cells with more than 1.5 million polarity reversals without substantive deterioration.

Other advantages include low volume, high efficiency, suitability for microminiaturization, and the inherent self-contained nature of the integrated electrochemical control valve embodiment illustrated in FIG. 5. No additional auxiliary fluids are required. The system requires only a DC power source. Signals from external sources can be processed easily to control the operation of the valve.

Obviously, other embodiments and modifications of the present invention will occur readily to those of ordinary skill in the art in view of these teachings. Therefore, this invention is to be limited only by the following claims, which include all such obvious embodiments and modifications when viewed in conjunction with the above specifications and accompanying drawings.

I claim:

1. A control valve and actuator assembly comprising:
 a gas-tight housing having two ends and a first wall at a first end;
 flexible bellow means, disposed to form a second wall at a second end of said fluid-tight housing, having a first contacting surface;
 a rigidly-supported electrolytic membrane having two sides disposed in said gas-tight housing and defining therein, with said first wall, a storage chamber for holding a supply of electrochemically active gas, and defining therein, with said flexible bellows means, a pump chamber;
 one pervious electrode disposed on each said side of and in contact with said electrolytic membrane;
 said electrode on a first said side of said electrolytic membrane and said electrode on a second said side of said electrolytic membrane being disposed to form one electrode pair separated by said electrolytic membrane;
 said gas being electrochemically reversibly active so as to enter into an anodic reaction at one said electrode where the gas molecules are converted to ions transportable through said electrolytic membrane and a cathodic reaction at the opposite electrode in said electrode pair where said ions are reconverted to gas molecules;
 a valve means having a second contacting surface disposed in contact with said first contacting surface adapted to open and close said valve means by moving forward and backward in response to motion of said flexible bellows means;
 means for providing a reversible electric current to said electrode pair, said electric current acting to transport said ions through said electrolytic membrane whereby said gas is pumped reversibly from one side of said electrolytic membrane to the other;
 pressure sensing means for sensing the pressure of said gas in said gas-tight pump chamber; and
 control means, responsive to said pressure sensing means for varying the magnitude and direction of said electric current.

2. The apparatus of claim 1 wherein said pressure sensing means comprises an integrated electrochemical pressure sensor comprising at least one additional pair of electrodes disposed on opposite sides of said electrolytic membrane in electrical isolation from said pervious electrode pair.

3. The apparatus of claim 2 further comprising:

means for measuring the rate of fluid flow controlled by said valve; and second control means, responsive to said flow rate sensing means, for varying the magnitude and direction of said electric current.

4. The apparatus of claim 2 further comprising:

temperature sensing means for sensing the gas temperature in said pump chamber; and second control means, responsive to said temperature sensing means, for varying the magnitude and direction for said electric current.

5. The apparatus of claim 1 wherein said flexible bellows means comprises a flexible diaphragm.

6. Control valve and actuator assembly comprising:

a gas-tight housing having two ends and a first wall at a first end;

flexible bellows means, disposed to form a second wall at a second end of said fluid-tight housing, having a first contacting surface;

a rigidly-supported electrolytic membrane having two sides disposed in said gas-tight housing and defining therein, with said first wall, a storage chamber for holding a supply of electrochemically active gas, and defining therein, with said flexible bellows means, a pump chamber;

a plurality of pervious electrodes disposed on each said side of and in contact with said electrolytic membrane;

said plurality of electrodes on a first said side of said electrolytic membrane being separated from one another by spaces and said plurality of electrodes on a second said side of said electrolytic membrane being disposed to form, with said electrodes on said first side, a plurality of electrode pairs separated by said electrolytic membrane;

said gas being electrochemically reversibly active so as to enter into an anodic reaction at one said plurality of electrodes where the gas molecules are converted to ions transportable through said electrolytic membrane and a cathodic reaction at the opposite electrodes in said plurality of electrode pairs where said ions are reconverted to gas molecules;

a valve means having a second contacting surface disposed in contact with said first contacting surface adapted to open and close said valve means by moving forward and backward in response to motion of said flexible bellows means;

means for providing a reversible electric current to said plurality of electrode pairs, said electric current acting to transport said ions through said electrolytic membrane whereby said gas is pumped reversibly from one side of said electrolytic membrane to the other;

pressure sensing means for sensing the pressure of said gas in said gas-tight pump chamber; and control means, responsive to said pressure sensing means for varying the magnitude and direction of said electric current.

7. The apparatus of claim 6 wherein said pressure sensing means comprises an integrated electrochemical pressure sensor comprising at least one additional pair of electrodes disposed on opposite sides of said electrolytic membrane in electrical isolation from said plurality of pervious electrode pairs.

8. The apparatus of claim 7 further comprising:

means for measuring the rate of fluid flow controlled by said valve; and second control means, responsive to said flow rate sensing means, for varying the magnitude and direction of said electric current.

9. The apparatus of claim 7 further comprising:

temperature sensing means, for sensing the gas temperature in said pump chamber; and second control means, responsive to said temperature sensing means for varying the magnitude and direction for said electric current.

10. The apparatus of claim 6 wherein said flexible bellows means comprises a flexible diaphragm.

* * * * *

UNITED STATES PATENT AND TRADEMARK OFFICE
CERTIFICATE OF CORRECTION

PATENT NO. : 5,038,821
DATED : August 13, 1991
INVENTOR(S) : Henri J.R. Maget, Ph.D.

It is certified that error appears in the above-identified patent and that said Letters Patent is hereby corrected as shown below:

Column 3, line 34, "rigid by" should read --rigidly--

Column 4, lines 28-33, "For hydrogen, this voltage in similar is approximately 13 1 n ($P_{ratio}$). Thus, for a pressure ratio (Pratio) of 1.01, the sensor output voltage at electrodes 20 is about 0.13 similar." should read --For hydrogen, this voltage in similar cells is approximately 13.1 n ($P_{ratio}$). Thus, for a pressure ratio of 1.01, the sensor output voltage at electrodes 20 is about 0.13.--

Signed and Sealed this

Twenty-third Day of March, 1993

*Attest:*

STEPHEN G. KUNIN

*Attesting Officer*     Acting Commissioner of Patents and Trademarks